(12) United States Patent
Wang

(10) Patent No.: US 12,489,365 B2
(45) Date of Patent: Dec. 2, 2025

(54) RESONANT CONVERTER WITH PRIMARY WINDING SHORT TO INCREASE ENERGY IN RESONANT TANK

(71) Applicant: Aplus Power Technology (Hangzhou) Co., Ltd., Hangzhou (CN)

(72) Inventor: Yuetian Wang, Hangzhou (CN)

(73) Assignee: Aplus Power Technology (Hangzhou) Co., Ltd., Hangzhou (CN)

( * ) Notice: Subject to any disclaimer, the term of this patent is extended or adjusted under 35 U.S.C. 154(b) by 221 days.

(21) Appl. No.: 18/346,643

(22) Filed: Jul. 3, 2023

(65) Prior Publication Data

US 2024/0006990 A1   Jan. 4, 2024

(30) Foreign Application Priority Data

Jul. 4, 2022   (CN) .......................... 202210778349.2

(51) Int. Cl.
*H02M 3/335* (2006.01)
*H02M 1/00* (2006.01)
*H02M 3/00* (2006.01)

(52) U.S. Cl.
CPC ........... *H02M 3/01* (2021.05); *H02M 1/0096* (2021.05); *H02M 3/33571* (2021.05); *H02M 3/33573* (2021.05)

(58) Field of Classification Search
CPC .......................... H02M 3/01; H02M 3/335–42
See application file for complete search history.

(56) References Cited

U.S. PATENT DOCUMENTS

| 9,762,115 B2 * | 9/2017 | Sharma ................. H02M 7/797 |
| 2015/0062971 A1 * | 3/2015 | Ye ..................... H02M 3/33573 363/17 |

FOREIGN PATENT DOCUMENTS

| CN | 108696140 A | 10/2018 |
| CN | 110707931 A | 1/2020 |
| CN | 218243348 U | 1/2023 |

OTHER PUBLICATIONS

China National Intellectual Property Administration, "The First Office Action and Search Report," issued in connection with Chinese Patent Application No. 202210778349.2, dated Aug. 12, 2025, 18 pages.

* cited by examiner

*Primary Examiner* — Peter M Novak
(74) *Attorney, Agent, or Firm* — Hanley, Flight & Zimmerman, LLC

(57) ABSTRACT

Embodiments of this disclosure provide a power supply device, a resonant converter circuit and controlling method thereof. The circuit includes: an inverter circuit, a resonant circuit, a rectifier circuit, a switch, and a second inductor, wherein the inverter circuit is connected to the resonant circuit for converting direct currents into alternating currents to output to the resonant circuit, the resonant circuit is connected to the rectifier circuit for outputting the alternating currents to the rectifier circuit after resonant conversion, and the rectifier circuit is used for outputting direct currents; the resonant circuit includes a first inductor and a first capacitor, the first inductor, the first capacitor and the second inductor are connected in series, the switch is connected in parallel with the second inductor, and the rectifier circuit is connected to both ends of the second inductor. With the embodiments of this disclosure, output voltage gains of a resonant converter may be improved while efficiency of the resonant converter is not affected, thereby extending a hold time.

16 Claims, 11 Drawing Sheets

RESONANT CONVERTER WITH PRIMARY WINDING SHORT TO INCREASE ENERGY IN RESONANT TANK

RELATED APPLICATION

This patent claims priority to Chinese Patent application 202210778349.2, which was filed on Jul. 4, 2022, which is hereby incorporated by reference in its entirety.

TECHNICAL FIELD

This disclosure relates to the field of control circuits, and in particular to a power supply device, a resonant converter circuit and controlling method thereof.

BACKGROUND

FIG. 1 is a schematic diagram of a structure of an existing power supply system. As shown in FIG. 1, the power supply system includes a pre-stage converter 101, an electrolytic capacitor 102 and a post-stage converter 103. In a server power supply or communication power supply system shown in FIG. 1, when input power of the pre-stage converter 101 is powered down, a powered device needs to back up data, that is, within a period of time (hold time $T_{hold}$) after the input power is powered down, the post-stage converter needs to be able to hold stability of the output voltage. In order to achieve higher efficiency and power density, a current post-stage converter generally chooses a resonant converter (an LLC converter).

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

After the input power is powered down, the input voltage of the post-stage converter will be decreased to support stability of the output voltage. FIG. 2 is a schematic diagram of the hold time. As shown in FIG. 2, $V_{bulk1}$ is a bus voltage at normal operation, and $V_{bulk2}$ is a bus voltage at the end of the hold time. As $$\frac{1}{2}C_{bulk}(V_{bulk1}^2 - V_{bulk2}^2) = P_{our} \times T_{hold},$$

in order to meet requirements of the hold time $T_{hold}$, in related techniques, a bus capacitance value $C_{bulk}$ of a relatively large capacitance value may be selected. However, capacitors with a larger capacitance value will correspond to a larger volume, which will affect boost of power density in the power supply; or, it is possible to increase the bus voltage $V_{bulk1}$, but in order that the resonant converter is able to operate at a higher efficiency, the bus voltage $V_{bulk1}$ may only be fine-tuned; or, it is possible to reduce the bus voltage $V_{bulk2}$, but the premise for decrease in bus voltage $V_{bulk2}$ is that the LLC converter has a relatively large output voltage gain. If the gain of the output voltage is increased simply through design of LLC parameters, efficiency of the LLC converter will be lowered.

Addressed to at least one of the above problems, embodiments of this disclosure provide a power supply device, a resonant converter circuit and controlling method thereof.

Following is technical solutions of the embodiments of this disclosure.

According to a first aspect of the embodiments of this disclosure, there is provided a resonant converter circuit, the circuit including: an inverter circuit, a resonant circuit, a rectifier circuit, a switch, and a second inductor, wherein, the inverter circuit is connected to the resonant circuit for converting direct currents into alternating currents to output to the resonant circuit, the resonant circuit is connected to the rectifier circuit for outputting the alternating currents to the rectifier circuit after resonant conversion, and the rectifier circuit is used for outputting direct currents;

the resonant circuit includes a first inductor and a first capacitor, the first inductor, the first capacitor and the second inductor are connected in series, the switch is connected in parallel with the second inductor, and the rectifier circuit is connected to both ends of the second inductor.

According to a second aspect of the embodiments of this disclosure, there is provided a method for controlling a resonant converter circuit, wherein the method includes:

sampling an output voltage of the resonant converter circuit described in the first aspect to generate an output voltage sampling signal;

generating a control signal according to the output voltage sampling signal; and driving the switch to turn on or off according to the control signal.

According to a third aspect of the embodiments of this disclosure, there is provided a power supply device, including the resonant converter circuit as described in the first aspect.

An advantage of the embodiments of this disclosure exists in that the switch is connected in parallel at both ends of the resonant converter inductor. By short-circuiting the switch, energies of the resonant inductor and resonant capacitor are increased, which may improve output voltage gains of the resonant converter while efficiency of the resonant converter is not affected, thereby extending a hold time.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The accompanying drawings described herein are for explanation only, and are not intended to limit the scope of this disclosure in any way. In addition, shapes and proportional dimensions of the components in the drawings are illustrative only and are intended to assist in understanding this disclosure, but are not intended to specifically limit the shapes and proportional dimensions of the components in this disclosure. With the teachings of this disclosure, those

DETAILED DESCRIPTION OF THE DISCLOSURE

The technical solutions of this disclosure shall be explained below in detail with reference to the accompanying drawings and specific embodiments. It should be understood that these embodiments are only used to illustrate this disclosure and not to limit the scope of this disclosure. After reading this disclosure, all modifications to various equivalent forms of this disclosure by those skilled in the art will fall within the scope of the claims attached to this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

All technical and scientific terms used herein have the same meanings as commonly understood by those skilled in the art to which this disclosure pertains, unless otherwise defined. The terminology used in the description of this disclosure is for the purpose of describing particular embodiments and is not intended to limit this disclosure. The term "and/or" as used herein includes any and all combinations of one or more of the associated listed items.

Embodiment of a First Aspect

Figure 3:
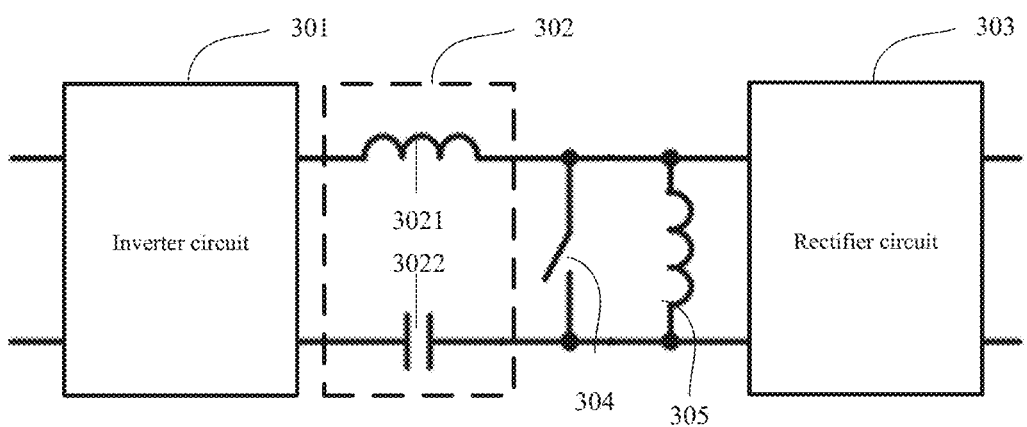
FIG. 3 is a schematic diagram of a structure of a resonant converter circuit of an embodiment of this disclosure.

The embodiment of the first aspect of this disclosure provides a resonant converter circuit. FIG. 3 is a schematic diagram of a structure of the resonant converter circuit of the embodiment of this disclosure. As shown in FIG. 3, the circuit includes: an inverter circuit 301, a resonant circuit 302, a rectifier circuit 303, a switch 304, and a second inductor 305, wherein, the inverter circuit 301 is connected to the resonant circuit 302 for converting direct currents into alternating currents to output to the resonant circuit, the resonant circuit 302 is connected to the rectifier circuit 303 for outputting the alternating currents to the rectifier circuit 303 after resonant conversion, and the rectifier circuit 303 is used for outputting direct currents;

the resonant circuit 302 includes a first inductor 3021 and a first capacitor 3022, the first inductor 3021, the first capacitor 3022 and the second inductor 305 are connected in series, the switch 304 is connected in parallel with the second inductor 305, and the rectifier circuit 303 is connected to both ends of the second inductor 305.

In some embodiments, the inverter circuit 301 may convert direct currents into alternating currents, and the inverter circuit 301 includes a direct current positive input terminal, a direct current negative input terminal, an inverter output end 1 and an inverter output end 2. The direct current positive input terminal and direct current negative input terminal are used for direct current input.

Figure 4A:
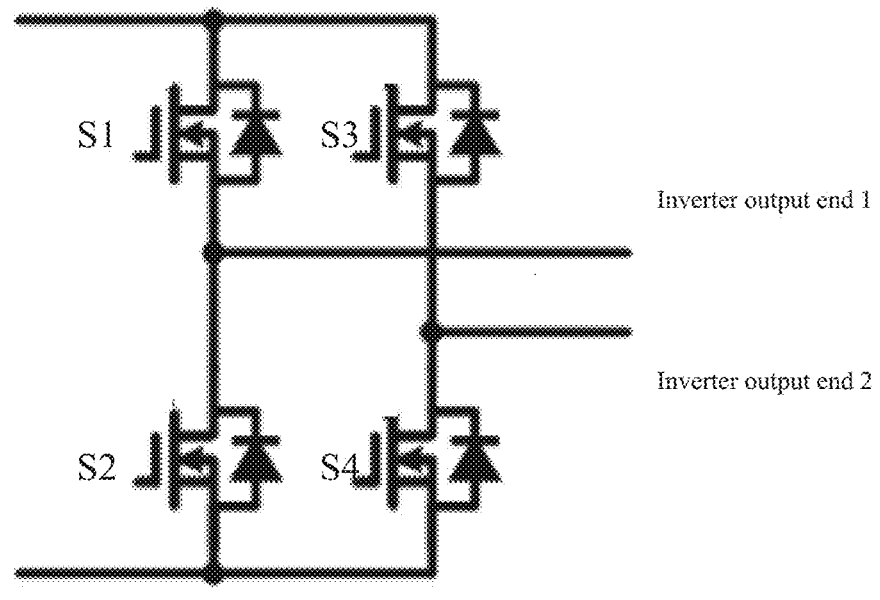
FIG. 4A is a schematic diagram of a structure of the converter circuit when it is a full-bridge converter circuit in the embodiment of this disclosure.
Figure 4B:
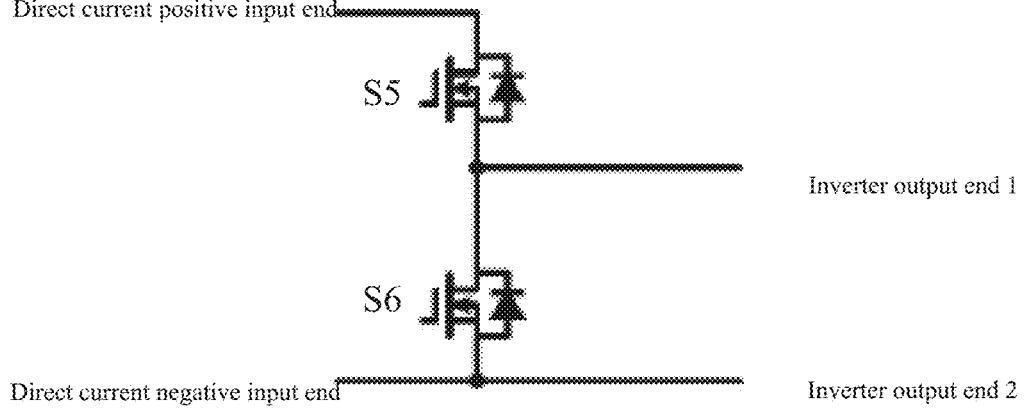
FIGS. 4B-4C are schematic diagrams of a structure of the converter circuit when it is a half-bridge converter circuit in the embodiment of this disclosure.
Figure 4C:
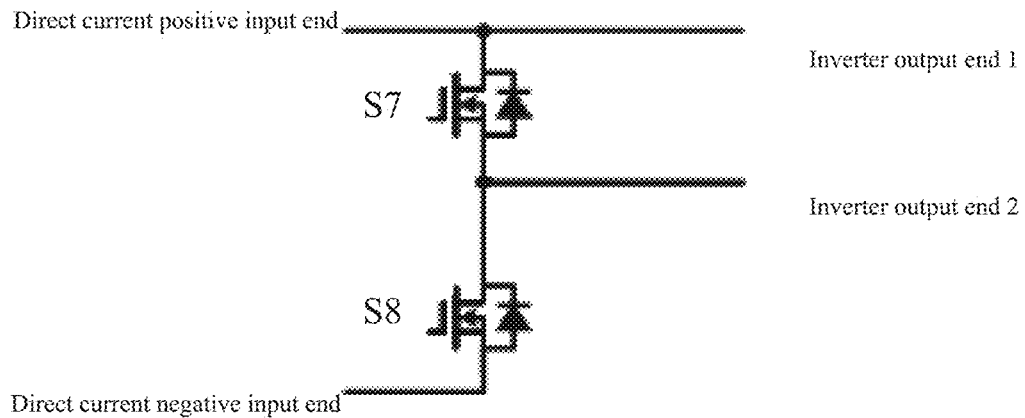

In some embodiments, the inverter circuit 301 may be a full-bridge inverter circuit or a half-bridge inverter circuit; however, this embodiment is not limited thereto. FIG. 4A is a schematic diagram of a structure of the converter circuit when it is a full-bridge converter circuit, and FIGS. 4B-4C are schematic diagrams of a structure of the converter circuit when it is a half-bridge converter circuit. As shown in FIG. 4A, the inverter circuit 301 includes a first power switch tube S1, a second power switch tube S2, a third power switch tube S3 and a fourth power switch tube S4. A first pole of the first power switch tube S1 is connected to the direct current positive input terminal, a second pole of the first power switch tube S1 is connected to the inverter output end 1, a first pole of the second power switch tube S2 is connected to the inverter output end 1, a second pole of the second power switch tube S2 is connected to the direct current negative input terminal, a first pole of the third power switch tube S3 is connected to the direct current positive input terminal, a second pole of the third power switch tube S3 is connected to the inverter output end 2, a first pole of the fourth power switch tube S4 is connected to the inverter output end 2, and a second pole of the fourth power switch tube S4 is connected to the direct current negative input terminal.

As shown in FIG. 4B, the inverter circuit 301 includes a first power switch tube S5 and a second power switch tube S6. A first pole of the first power switch tube S5 is connected to the direct current positive input terminal, a second pole of the first power switch tube S5 is connected to the inverter output end 1, a first pole of the second power switch tube S6 is connected to the inverter output end 1, a second pole of the second power switch tube S6 is connected to the inverter output end 2, and the direct current negative input terminal is electrically connected to the inverter output end 2.

As shown in FIG. 4C, the inverter circuit 301 includes a first power switch tube S7 and a second power switch tube S8. A first pole of the first power switch tube S7 is connected to the inverter output end 1, a second pole of the first power switch tube S7 is connected to the inverter output end 2, a first pole of the second power switch tube S8 is connected to the inverter output end 2, a second pole of the second power switch tube S8 is connected to the direct current negative input terminal, and the direct current positive input terminal is electrically connected to the inverter output end 1.

The above first and second poles may be D poles (drains or collectors) and S poles (sources or emitters), and this embodiment is not limited thereto. The above switch tubes are power semiconductor switching devices, including power MOS tubes, IGBTs, BJTs, thyristors, and IGCTs, etc.

The components and connection relationships of the inverter circuit 301 are examples only, and this disclosure is not limited thereto.

In some embodiments, the inverter circuit 301 is connected to the resonant circuit 302, and alternating currents outputted by the inverter circuit 301 are applied to both ends of the resonant circuit 302, generating high-frequency resonance. The resonant circuit 302 includes a first inductor (Lr) 3021 and a first capacitor (Cr) 3022 in series. The first inductor Lr is a resonant inductor, and the first capacitor Cr is a resonant capacitor. The second inductor (Lm) 305 is connected in series with the first inductor 3021 and the first capacitor 3022. For example, the second inductor is located in the middle of the first inductor and the first capacitor; however, an order of connection of the first inductor, the second inductor, and the first capacitor is not limited in this disclosure.

Figure 5A:
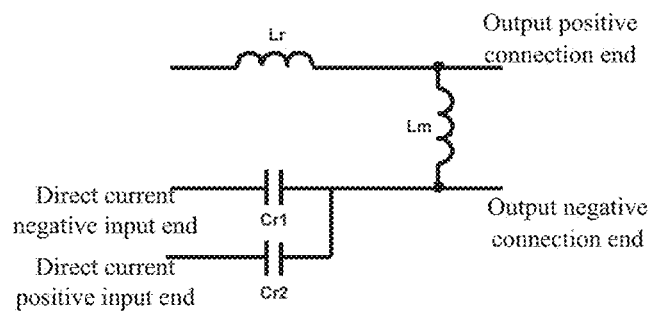
FIGS. 5A-5B are schematic diagrams of a first capacitor connected to the half-bridge converter circuit in the embodiment of this disclosure.
Figure 5B:
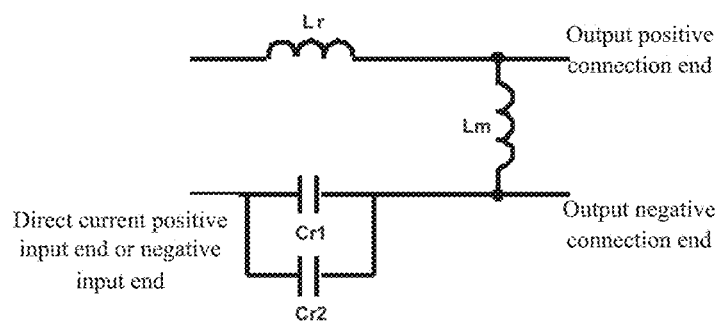

In some embodiments, FIGS. 5A and 5B are schematic diagrams of the connection between the first capacitor and the half-bridge inverter circuit. As shown in FIG. 5B, the first capacitor Cr may be composed of two parallel capacitors, namely a first sub-capacitor Cr1 and a second sub-capacitor Cr2, which are connected in parallel. One end of the parallel first sub-capacitor and the second sub-capacitor is connected to the direct current positive input or direct current negative input of the inverter circuit 301, and one end of the first inductor is connected to the inverter output end 1. On this basis, the first sub-capacitor and the second sub-capacitor may be disconnected from points where they are connected to the inverter circuit, and respectively connected to the direct current positive input and direct current negative input of the inverter circuit. One end of the first inductor is connected to an inverter output 1, as shown in FIG. 5A. With the circuit shown in FIG. 5A, a better effect of suppression of electromagnetic interference may be achieved. The above connection relationship is illustrative only, and the embodiment of this disclosure is not limited thereto.

In some embodiments, an output positive connection end and output negative connection end of the resonant circuit 302 are connected to both ends of the switch 304 and the two ends of the rectifier circuit 303, that is, the switch 304 and the rectifier circuit 303 are connected in parallel with the second inductor 305, which shall be described below respectively.

In some embodiments, the rectifier circuit 303 may convert the alternating currents outputted by the resonant circuit 302 into direct currents. The rectifier circuit 303 may be a full-bridge rectifier circuit or a half-bridge rectifier circuit. The rectifier circuit 303 includes a first connection end, a second connection end, a direct current positive output end and a direct current negative output end. The direct current positive output end and direct current negative output end are used for output of direct currents, and the first connection end and the second connection end may be respectively connected to the output positive connection end and output negative connection end of the resonant circuit 302, or, in other words, the first connection end and the second connection end may be respectively connected to both ends of the second inductor 305.

Figure 6A:
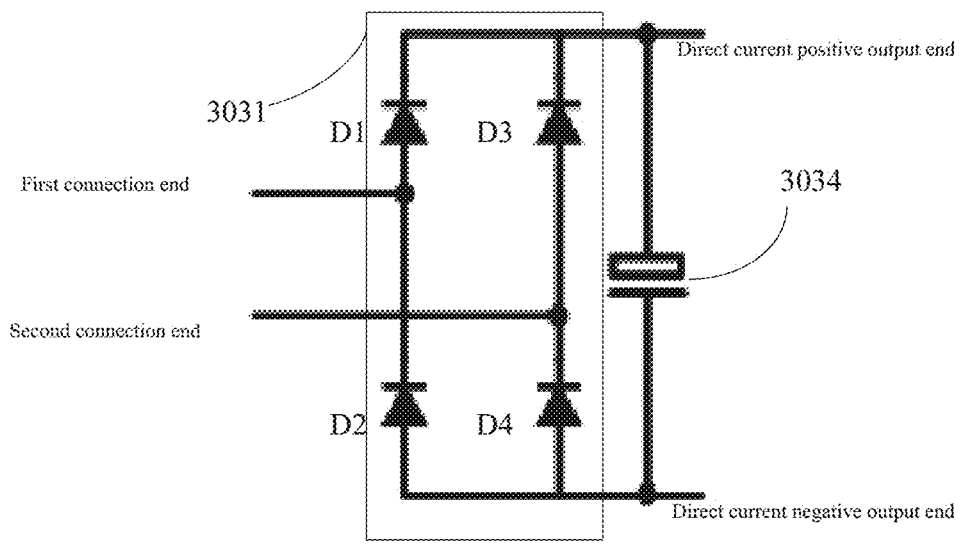
FIGS. 6A and 6B are schematic diagrams of a partial structure of a rectifier circuit in the embodiment of this disclosure.
Figure 6B:
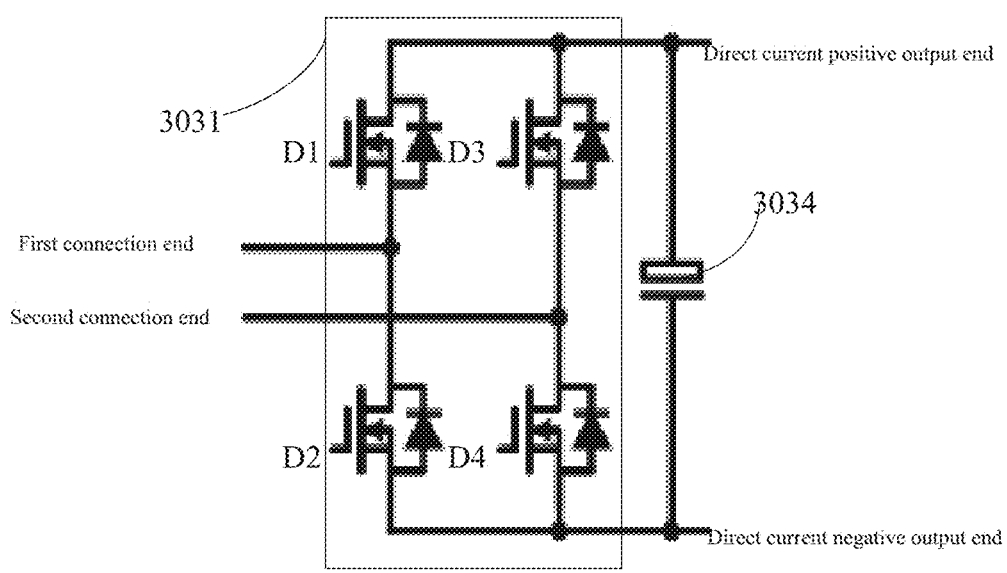

In some embodiments, the rectifier circuit 303 includes rectifier tubes 3031, which include at least one diode and/or at least one synchronous rectifier tube, that is, the rectifier tubes may all be diodes, or may all be synchronous rectifier tubes, or may be a combination of diodes and synchronous rectifier tubes. FIGS. 6A and 6B are schematic diagrams of a partial structure of the rectifier circuit (a full-bridge rectifier circuit is taken as an example) in the embodiment of this disclosure. As shown in FIGS. 6A and 6B, the rectifier circuit 303 includes four rectifier tubes, all of which are diodes (FIG. 6A), or are all synchronous rectifier tubes (FIG. 6B). A second pole of rectifier tube D1 and a first pole of rectifier tube D2 are connected to a first connecting end, a second pole of rectifier tube D3 and a first pole of rectifier tube D4 are connected to a second connecting end, a first pole of rectifier tube D1 and a first pole of rectifier tube D3 are connected to the direct current positive output end, and a second pole of rectifier tube D2 and a second pole of rectifier tube D4 are connected to the direct current negative output end. Four rectifier tubes are taken as an example above; however, the number is not limited thereto, for example, the number may also be 1, or 2, or 3, etc., which shall not be enumerated herein any further.

In some embodiments, the rectifier circuit 303 may further include a second capacitor 3034 (an output capacitor), both ends of the second capacitor 3034 being respectively to the direct current positive output end and the direct current negative output end, that is, being connected in parallel with the two ends of the rectifier circuit 303.

Figure 7A:
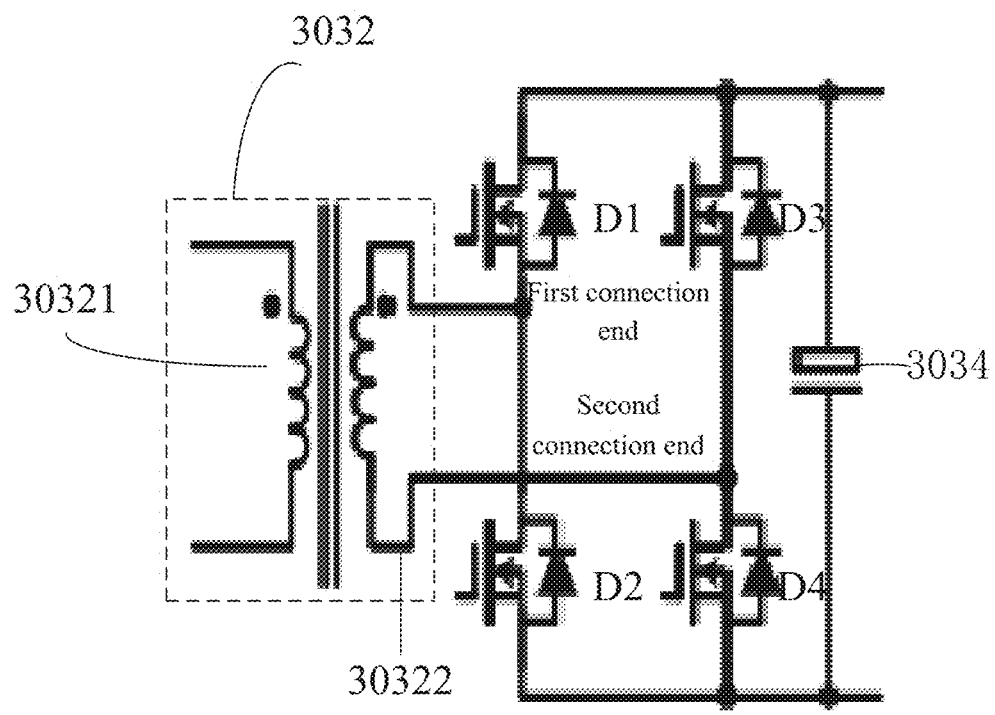
FIGS. 7A-7B are schematic diagrams of a structure of the rectifier circuit in the embodiment of this disclosure.
Figure 7B:
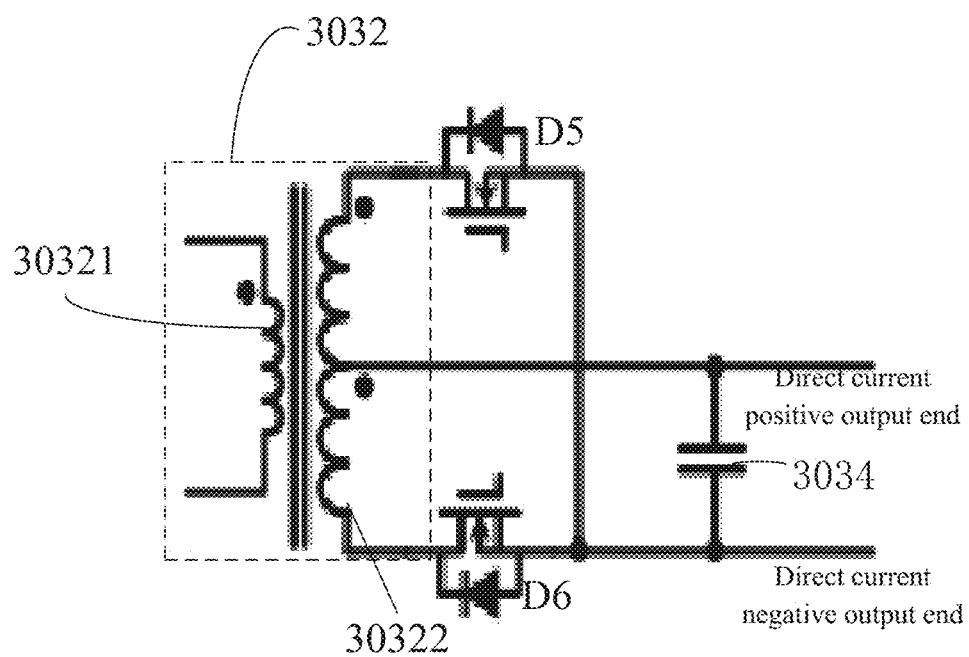

In some embodiments, optionally, the rectifier circuit may include a transformer 3032, which includes a transformer primary winding 30321 and a transformer secondary winding 30322. Two ends of the primary winding are respectively connected to the output positive connection end and the output negative connection end of the resonant circuit 302, and the secondary winding of the transformer may be of a two-end structure or may be a three-end structure with a central tap, and this disclosure is not limited thereto. FIGS. 7A-7B are schematic diagrams of a structure of the rectifier circuit 303 in the embodiment of this disclosure. As shown in FIG. 7A, the rectifier circuit includes a secondary winding (of a two-end structure), two ends of the secondary winding being respectively connected to the first connection end and the second connection end; and as shown in FIG. 7B, the rectifier circuit includes two secondary windings (of a three-end structure), two ends of one of the secondary windings being respectively connected to the first pole of the rectifier tube D5 and the direct current positive output end, and two ends of the other one of the secondary windings being respectively connected to the first pole of the rectifier tube D6 and the direct current positive output end. The second pole of the rectifier tube D5 and the second pole of the rectifier tube D6 are connected to the direct current negative output end.

Figure 8:
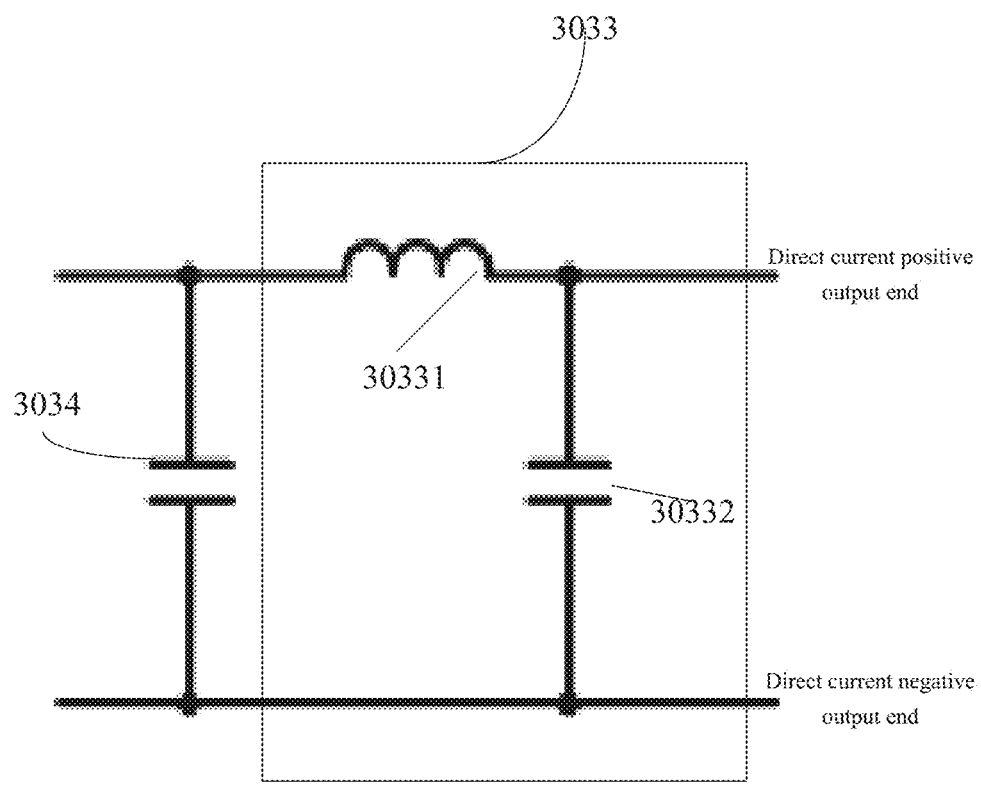
FIG. 8 is a schematic diagram of a structure of a filter circuit in the embodiment of this disclosure.

In some embodiments, optionally, the rectifier circuit further includes a filter circuit 3033, which may be an LC filter circuit. FIG. 8 is a schematic diagram of a structure of the filter circuit. As shown in FIG. 8, the filter circuit includes a third inductor 30331 and a third capacitor 30332 connected in series, one end of the third inductor 30331 being connected to one end of the second capacitor 3034, one end of the third capacitor 30332 being connected to the other end of the second capacitor 3034, the other end of the third inductor 30331 being connected to the other end of the third capacitor 30332, and both ends of the third capacitor 30332 serving as the direct current positive output end and the direct current negative output end of the rectifier circuit.

Figure 9:
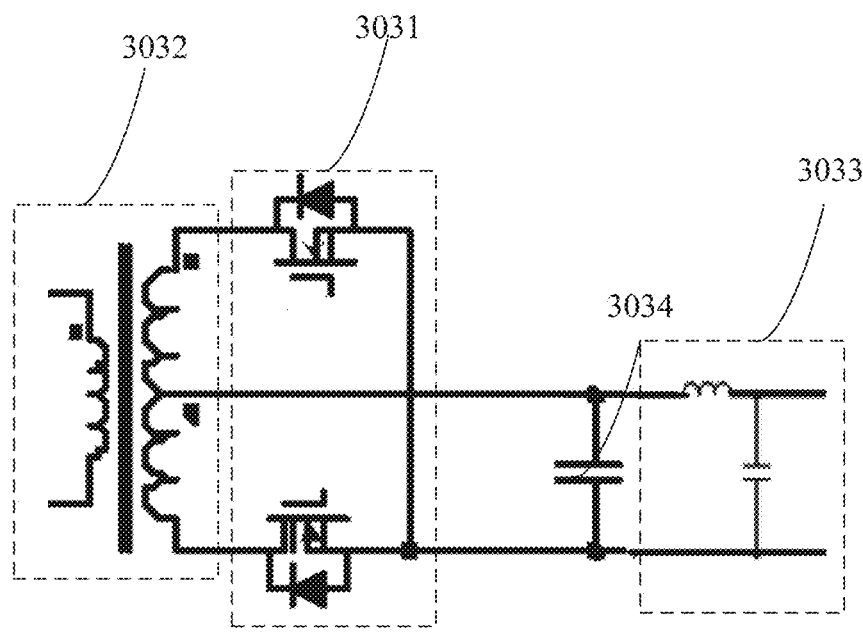
FIG. 9 is a schematic diagram of a structure of the rectifier circuit in the embodiment of this disclosure.

FIG. 9 is a schematic diagram of a structure of the rectifier circuit in the embodiment of this disclosure. As shown in FIG. 9. The rectifier circuit 303 includes the rectifier transistor 3031, the second capacitor 3034, the transformer 3032 and the filter circuit 3033 described above; however, the embodiment of this disclosure is not limited thereto, wherein the transformer 3032 and filter circuit 3033 are both optional.

In some embodiments, the second inductor may be integrated into the transformer of the rectifier circuit and taken as a magnetizing inductor of the transformer (such as a transformer primary magnetizing inductance value). However, the embodiment of this disclosure is not limited thereto, and the second inductor may also be independent of the rectifier circuit and taken as an independent inductor. Reference may be made to relevant technologies for details, which shall not be enumerated herein any further.

In the embodiment of this disclosure, both ends of the second inductor are connected to the switch 304 in parallel. The two ends of the second inductor are short circuited by short circuiting the switch, thereby increasing voltages on the first inductor and first capacitor connected to the second inductor in series. During the short-circuiting process, energies of the first inductor and first capacitor are stored, thereby improving output voltage gains of the resonant converter without affecting its efficiency, and extending a hold time, which shall be described below in detail.

In some embodiments, the switch 304 is connected in parallel with the second inductor 305, or in other words, the output positive connection end and output negative connection end of the resonant circuit 302 are connected to both ends of the switch 304, or in other words, both ends of the switch 304 are connected to the first connection end and second connection end of the rectifier circuit 303.

In some embodiments, the switch 304 may be a short-circuit switch, and reference may be made to relevant technologies for implementation thereof, which shall not be repeated herein any further. Wherein, the switch 304 may be a bidirectional switch and uses a combination of a series of back-to-back switch tubes. FIGS. 10A-10D are schematic diagrams of a structure of the switch 304 in the embodiment of this disclosure. As shown in FIGS. 10A to 10D, the back-to-back switch tubes may be composed of two insulated gate bipolar transistors (IGBTs) or metal oxide field-effect transistors (MOSs) in series. This is an example only, and the embodiment of this disclosure is not limited thereto. As described above, the switch tubes may also be power semiconductor switching devices, including bipolar junction transistors (BJTs), thyristors, and integrated gate-commutated thyristors (IGCTs), etc.

Figure 10A:
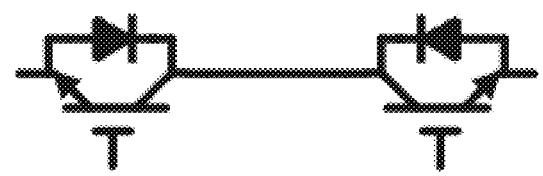
FIGS. 10A-10D are schematic diagrams of a structure of the switch 304 in the embodiment of this disclosure.
Figure 10B:
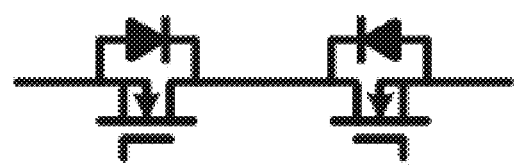
Figure 10C:
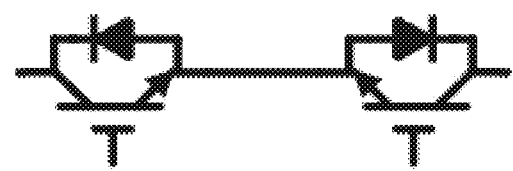
Figure 10D:
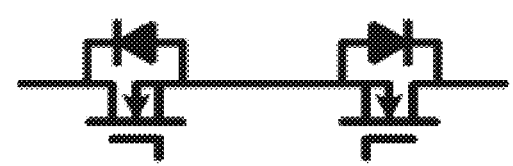

As shown in FIGS. 10A and 10B, D-poles of the two back-to-back switch tubes are connected, wherein S-poles of the two switch tubes are connected to both ends of the second inductor 305, respectively. As shown in FIGS. 10C and 10D, the S-poles of the two back-to-back switch tubes are connected, wherein the D-poles of the two switch tubes are connected to both ends of the second inductor 305, respectively.

Figure 10E:
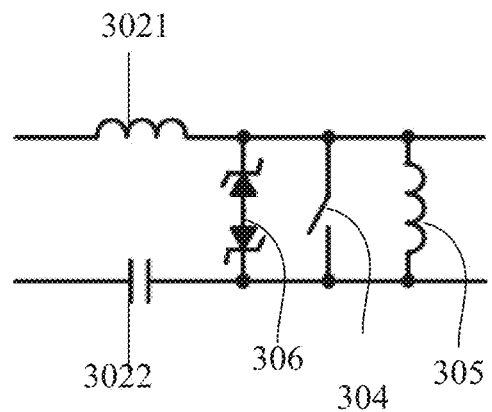
FIG. 10E is a schematic diagram of the switch 304 connected to a bidirectional TVS tube in the embodiment of this disclosure.

In some embodiments, the two ends of the switch 304 are also connected to bidirectional transient voltage suppression diodes (bidirectional TVS tubes), which are used for voltage clamp. FIG. 10E is a schematic diagram of the switch 304 connected to the bidirectional TVS tube. As shown in FIG. 10E, the bidirectional TVS tube 306 is connected to both ends of the switch 304. The bidirectional TVS tube may be an integrated bidirectional TVS tube, or may be composed of two opposite directional TVS single tubes connected in series, thereby reducing bidirectional switch voltage stress caused by parasitic inductance or leakage inductance.

Figure 11:
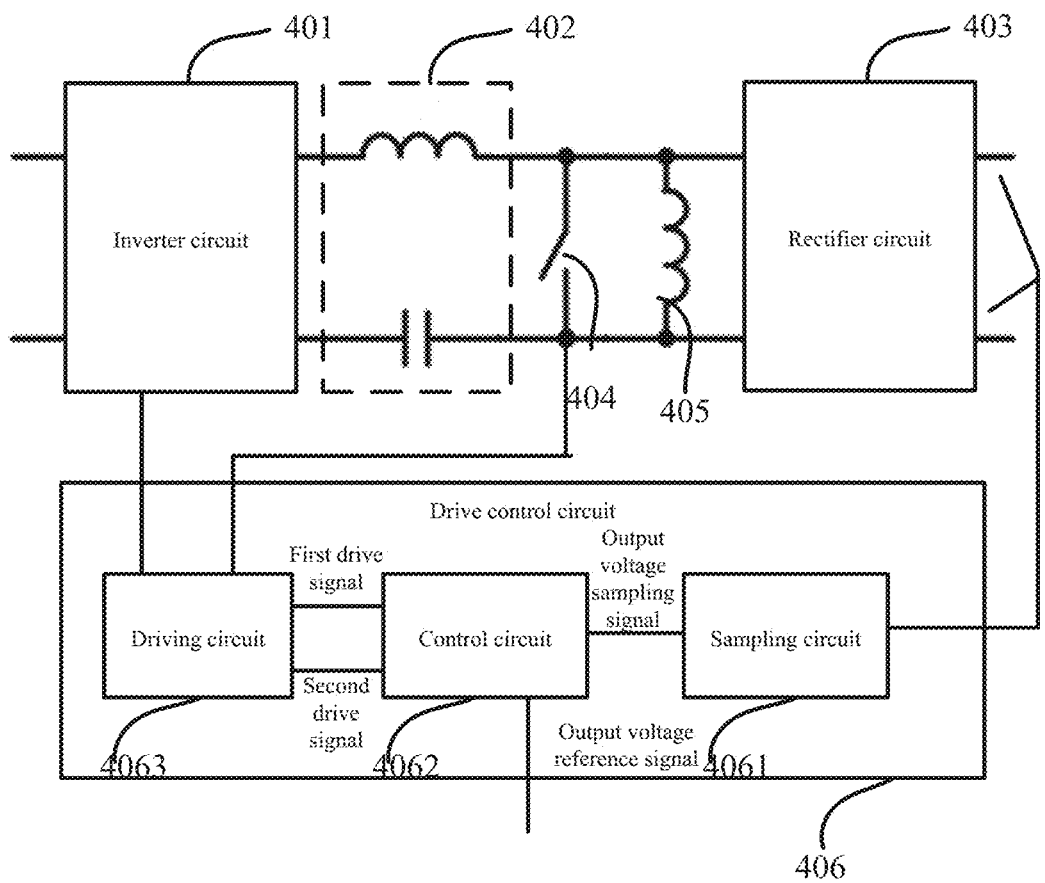
FIG. 11 is a schematic diagram of a structure of the resonant converter circuit in the embodiment of this disclosure.

FIG. 11 is a schematic diagram of a structure of the resonant converter circuit in the embodiment of this disclosure. As shown in FIG. 11. The circuit includes an inverter circuit 401, a resonant circuit 402, a rectifier circuit 403, a switch 404, and a second inductor 405. The drive control circuit 406 is connected to the switch 404 to output a control signal to the switch. Implementations of the inverter circuit 401, resonant circuit 402, rectifier circuit 403, switch 404 and second inductor 405 are identical to those of the inverter circuit 301, resonant circuit 302, rectifier circuit 303, switch 304, and second inductor 305, with repeated parts being not going to be described herein any further.

In some embodiments, the drive control circuit 406 controls conduction (turning on, switching on) of the switch at a predetermined time period at each switch cycle, so as to short-circuit both ends of the second inductor, thereby increasing voltages on the first inductor and first capacitor connected in series with the second inductor. During the short-circuiting process, energies of the first inductor and first capacitor are stored, thereby improving output voltage gains of the resonant converter without affecting its efficiency.

In some embodiments, the switch cycle is a period of an input voltage $V_{ab}$ of the resonant circuit 302, and the switch cycle (T) is greater than a resonant period of the first inductor and the first capacitor, the resonant period being $2\pi\sqrt{L_rC_r}$.

Figure 12:
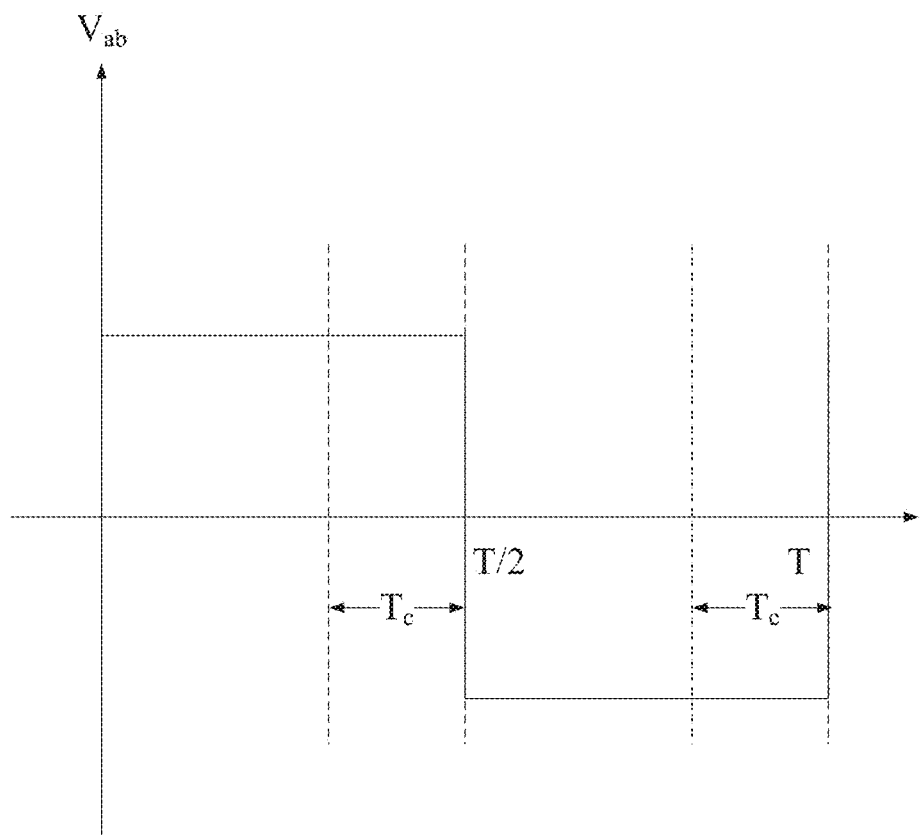
FIG. 12 is a schematic diagram of a switch cycle in the embodiment of this disclosure.

In some embodiments, FIG. 12 is a schematic diagram of the switch cycle in the embodiment of this disclosure. As shown in FIG. 12, the switch cycle includes symmetrical positive and negative levels, and durations of the positive and negative levels are both ½T, and the predetermined time period is a latter time period $T_C$ of positive and negative half cycles of the switch cycle. That is, the control cycle of the switch is ½T, therefore, the drive control circuit 406 turns on the switch 404 at the latter time period Tc of the positive and negative half cycles of the switch cycle, thereby reducing on and off currents of the switch 404, and short-circuiting the two ends of the second inductor.

In some embodiments, the drive control circuit 406 includes:

a sampling circuit 4061 configured to sample an output voltage of the rectifier circuit and generate an output voltage sampling signal;

a control circuit 4062 electrically connected to the sampling circuit and configured to generate a control signal according to the output voltage sampling signal; and a driving circuit 4063 connected to the control circuit and the switch and configured to drive the switch to turn on or off according to the control signal.

In some embodiments, the sampling circuit 4061 includes a third connection end, a fourth connection end and a fifth connection end. The third connection end and the fourth connection end are respectively connected to the two ends of the rectifier circuit 403, and the fifth connection end is connected to a sixth connection end of the control circuit 4062. The sampling circuit 4061 may be in an existing structure, which shall not be repeated herein any further.

In some embodiments, the control circuit 4062 further includes a seventh connection end, an eighth connection end and a ninth connection end. The seventh connection end is used for outputting a voltage reference signal (a preset voltage signal), and the eighth and ninth connection ends are connected respectively to a tenth and eleventh connection ends of the driving circuit 4063. The driving circuit 4063 further includes a twelfth and thirteenth connection ends, the twelfth connection end being electrically connected to the switch 404, and the thirteenth connection end being electrically connected to the inverter circuit 401.

In some embodiments, according to a result of comparison between an output voltage sampling signal and an output voltage reference signal, the control circuit 4062 generates a control signal, including a first drive signal and a second drive signal. The first drive signal is outputted to the driving circuit 4063 via connection between the eighth connection end and the tenth connection end to control conduction and disconnection (on and off) of the switch 404, and the second drive signal is outputted to the driving circuit 4063 via connection between the ninth connection end and the eleventh connection end to control conduction and disconnection of switch tubes in the inverter circuit 401.

In some embodiments, as an operating frequency of the inverter circuit 401 is equal to a reciprocal of a sum of conduction time and disconnection time of the switch tubes of the inverter circuit 401, the driving circuit 4063 controls the conduction and disconnection of the switch tubes of the inverter circuit 401 according to the second drive signal, thereby controlling the operating frequency of the inverter circuit 401. A duty cycle of the switch tubes of the inverter circuit 401 is 50%, and reference may be made to existing techniques for details, which shall not be repeated herein any further.

Figure 13:
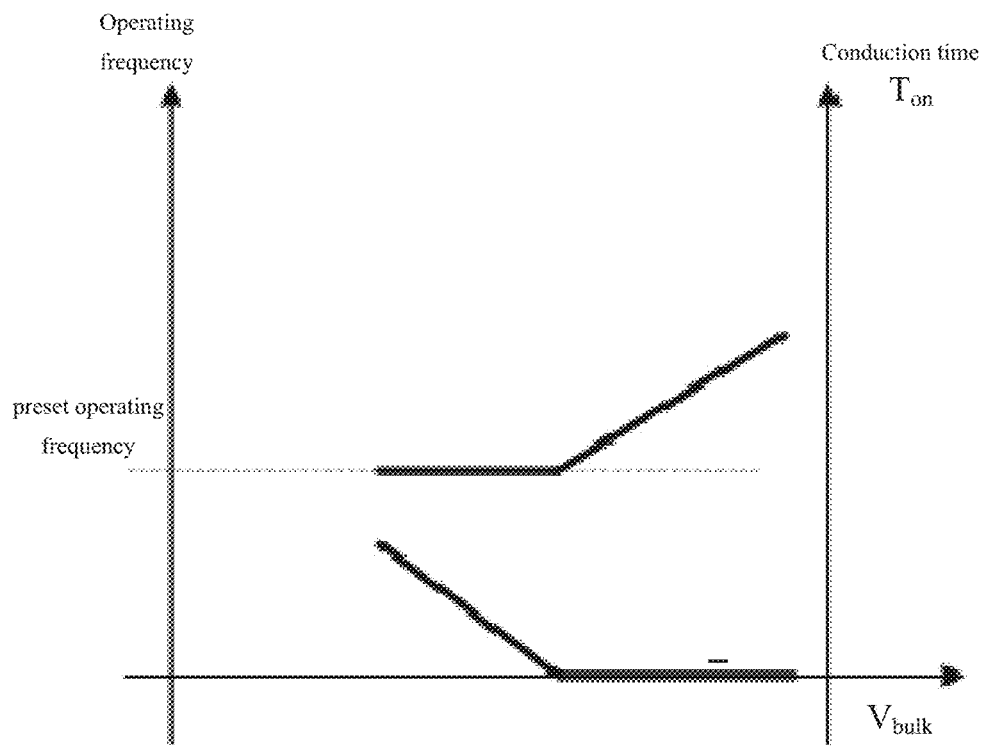
FIG. 13 is a schematic diagram of an operating frequency and a conduction time in the embodiment of this disclosure.

In some embodiments, the driving circuit further controls the conduction or disconnection of the switch 404 according to the first drive signal. FIG. 13 is a schematic diagram of a control logic of the operating frequency of the inverter circuit and a switching conduction time $T_{on}$ of the embodiment of this disclosure. As shown in FIG. 13, after the operating frequency reaches a preset frequency, the conduction time Tc of the switch 404 is controlled.

A workflow of the control circuit is as follows: lowering the operating frequency of the inverter circuit and increasing an output voltage gain of the resonant converter circuit when the output voltage sampling signal is smaller than the output voltage reference signal, so as to increase the output voltage; increasing the operating frequency of the inverter circuit and lowering the output voltage gain of the resonant converter circuit when the output voltage sampling signal is larger than the output voltage reference signal, so as to lower the output voltage; adjusting the output voltage gain of the resonant converter circuit by adjusting the conduction time of the switch when the operating frequency of the inverter circuit reaches the preset frequency, that is, increasing the conduction time of the switch and increasing the output voltage gain of the resonant converter circuit when the output voltage sampling signal is smaller than the output voltage reference signal, so as to increase the output voltage; and lowering the conduction time of the switch and lowering the output voltage gain of the resonant converter circuit when the output voltage sampling signal is larger than the output voltage reference signal, so as to lower the output voltage. It should be noted that no matter whether the conduction time of the switch is increased or lowered, the conduction time is at the latter time period $T_C$ of the positive and negative half cycles of the switch cycle. That is, when the output voltage sampling signal is smaller than the output voltage reference signal, $T_C$ is increased, and when the output voltage sampling signal is larger than the output voltage reference signal, $T_C$ is lowered.

It should be noted that the circuit in the above example may further include devices not shown in the drawings, and reference may be made to existing techniques for details, which is not limited in the embodiment of this disclosure; or, the circuit does not necessarily include all the components shown in FIG. 3, which shall not be enumerated herein any further.

For the sake of simplicity, connection relationships between the components or modules or signal profiles thereof are only illustrated in FIGS. 3-11. However, it should be understood by those skilled in the art that such related techniques as electrical connection, etc., may be adopted, which is not limited in the embodiment of this disclosure.

The above description is given by taking the resonant converter circuit as an example, including the drive control circuit. However, the embodiment of this disclosure is not limited thereto, and the drive control circuit may also be independent of the resonant converter circuit to control and drive the inverter circuit and the switch.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the switch is connected in parallel at both ends of the resonant converter inductor. By short-circuiting the switch, energies of the resonant inductor and resonant capacitor are increased, which may improve output voltage gains of the resonant converter while efficiency of the resonant converter is not affected, thereby extending a hold time.

Embodiment of a Second Aspect

Figure 14:
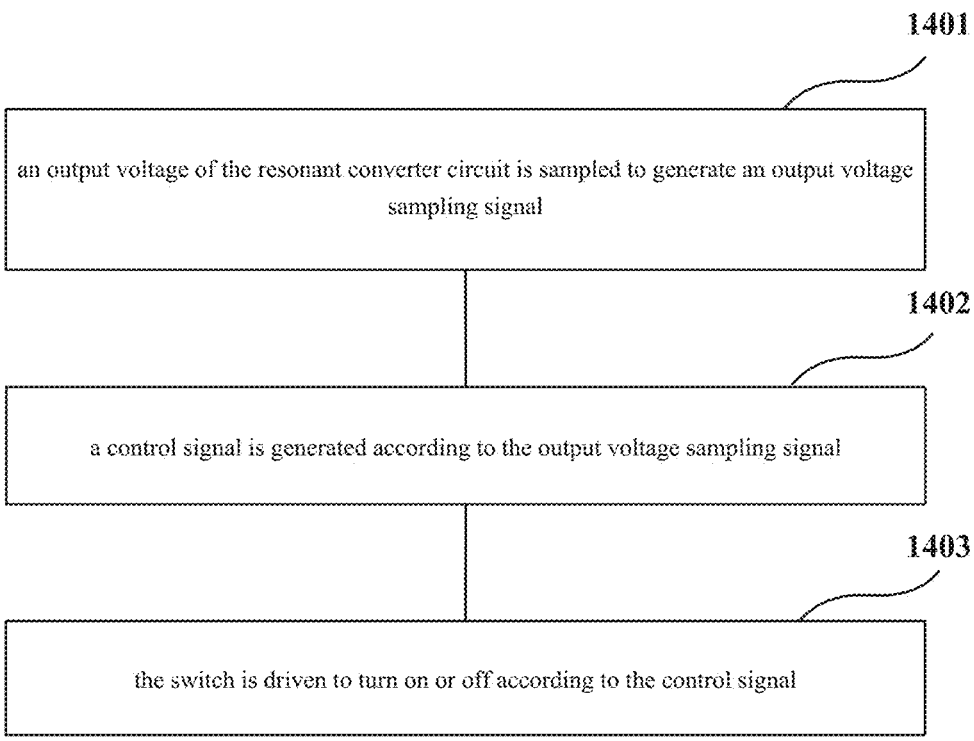
FIG. 14 is a schematic diagram of the method for controlling a resonant converter in an embodiment of this disclosure.

The embodiment of this disclosure provides a method for controlling a resonant converter. FIG. 14 is a schematic diagram of the method for controlling a resonant converter of the embodiment of this disclosure. As shown in FIG. 14, the method for controlling includes:

1401: an output voltage of the resonant converter circuit is sampled to generate an output voltage sampling signal;

1402: a control signal is generated according to the output voltage sampling signal; and

1403: the switch is driven to turn on or off according to the control signal.

In some embodiments, reference may be made to the embodiment of the first aspect for implementations of the resonant converter circuit and 1401-1403, with repeated parts being not going to be described herein any further.

In some embodiments, the control signal, including a first drive signal, may be generated according to a result of comparison between an output voltage sampling signal and an output voltage reference signal, and a conduction time of the switch in the resonant converter circuit may be controlled according to the first drive signal, and reference may be made to the embodiment of the first aspect for details, which shall not be repeated herein any further.

In some embodiments, in 1402, the control signal further includes a second drive signal, and in 1403, the conduction and disconnection of switch tubes of the inverter circuit are controlled according to the second drive signal, so as to control (adjust) an operating frequency of the inverter circuit.

In some embodiments, in 1403, the switch is controlled to turn on after the operating frequency reaches a preset frequency, and the switch is controlled to turn on at a predetermined time period of each switch cycle, so as to short-circuit both ends of the second inductor. The switch cycle is greater than a resonant period of the first inductor and the first capacitor, and the predetermined time period is the latter time period of the positive and negative half cycles of the switch cycle.

Figure 15:
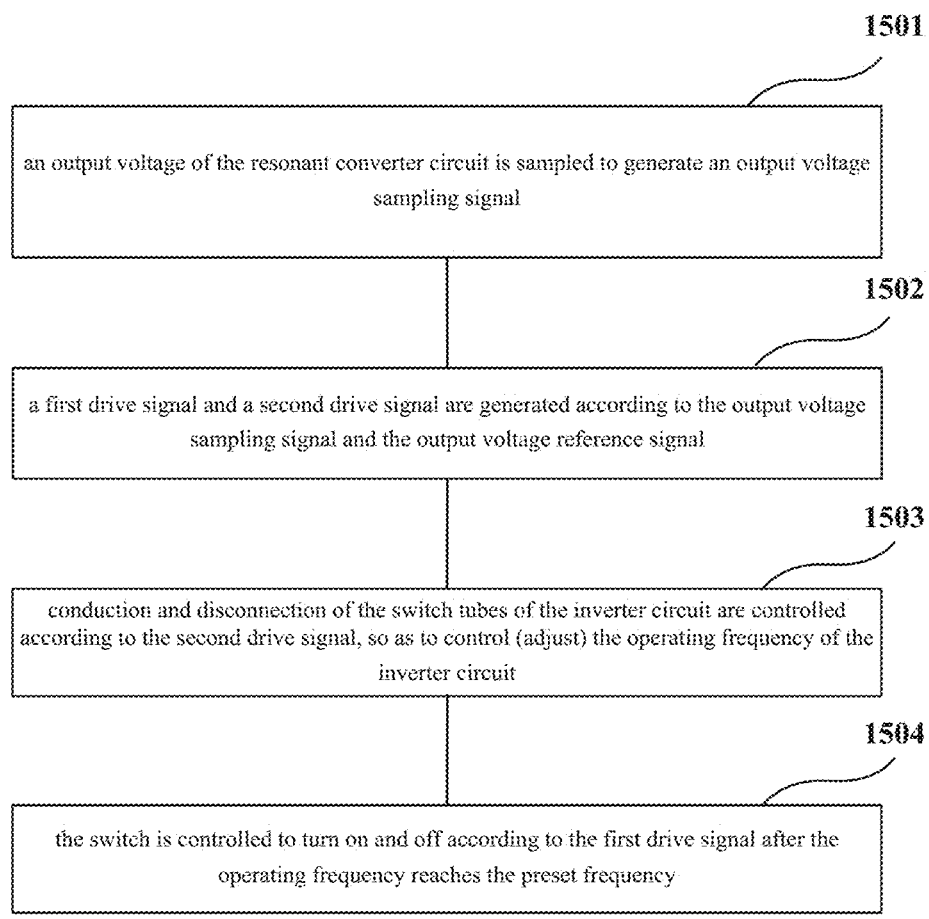
FIG. 15 is a schematic diagram of the method for controlling a resonant converter in the embodiment of this disclosure.

FIG. 15 is a schematic diagram of the method for controlling a resonant converter of the embodiment of this disclosure. As shown in FIG. 15, the method for controlling includes:

1501: an output voltage of the resonant converter circuit is sampled to generate an output voltage sampling signal;

1502: a first drive signal and a second drive signal are generated according to the output voltage sampling signal and the output voltage reference signal;

1503: conduction and disconnection of the switch tubes of the inverter circuit are controlled according to the second drive signal, so as to control (adjust) the operating frequency of the inverter circuit; and

1504: the switch is controlled to turn on and off according to the first drive signal after the operating frequency reaches the preset frequency.

In some embodiments, reference may be made to the embodiment of the first aspect for implementations of the resonant converter circuit and 1501-1504, with repeated parts being not going to be described herein any further.

In some embodiments, in 1504, the switch is controlled to turn on at a predetermined time period of each switch cycle and turn off at other time periods of the switch cycle. The switch cycle is greater than a resonant period of the first inductor and the first capacitor, and the predetermined time period is the latter time period of the positive and negative half cycles of the switch cycle.

It can be seen from the above embodiment that the switch is connected in parallel at both ends of the resonant converter inductor. By short-circuiting the switch, energies of the resonant inductor and resonant capacitor are increased, which may improve output voltage gains of the resonant converter while efficiency of the resonant converter is not affected, thereby extending a hold time.

Figure 1:
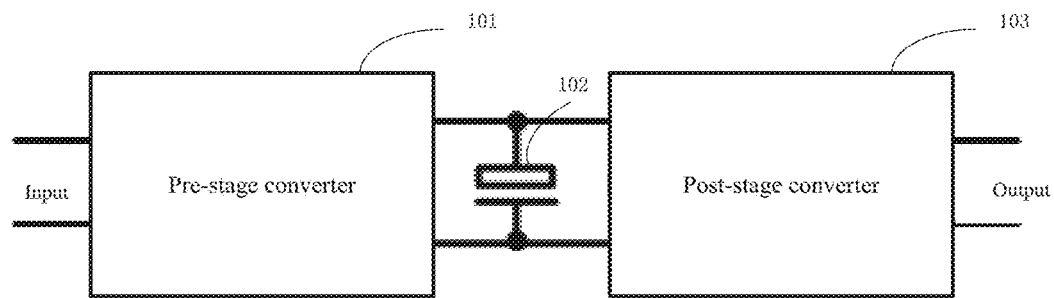
FIG. 1 is a schematic diagram of a structure of an existing power supply system.
Figure 2:
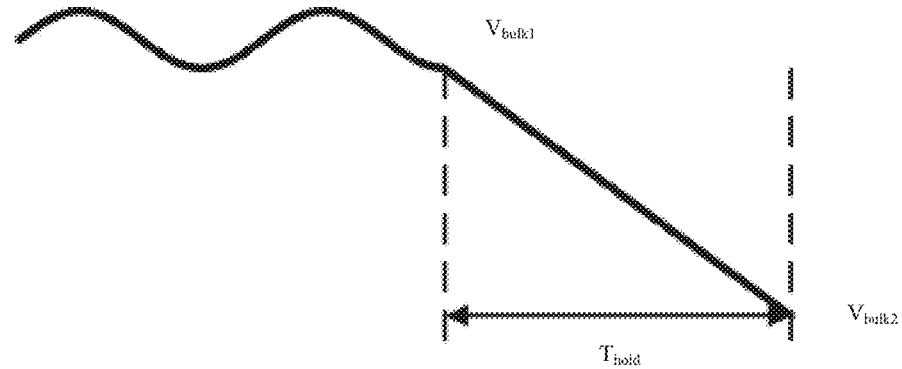
FIG. 2 is a schematic diagram of an existing hold time.

The embodiment of this disclosure further provides a power supply device, such as a server power supply or a communication power supply light. The power supply device is as shown in FIG. 1, and a post-stage converter includes the resonant converter circuit as described in the embodiment of the first aspect, with repeated parts being not going to be described herein any further.

An embodiment of this disclosure provides a computer readable program code, which, when executed in a power supply device or a resonant converter circuit, will cause a resonant converter circuit to carry out the method as described in the embodiment of the second aspect.

An embodiment of this disclosure provides a computer readable medium, including a computer readable program code, which will cause a resonant converter circuit to carry out the method as described in the embodiment of the second aspect.

The circuit/method described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in FIGS. 14 and 15. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

The invention claimed is:

1. A resonant converter circuit comprising:
   an inverter circuit;
   a resonant circuit;
   a rectifier circuit;
   a switch; and
   a second inductor, wherein,
   the inverter circuit is connected to the resonant circuit for converting direct currents into alternating currents to output to the resonant circuit, the resonant circuit is connected to the rectifier circuit for outputting the alternating currents to the rectifier circuit after resonant conversion, and the rectifier circuit is used for outputting direct currents;

the resonant circuit comprises a first inductor and a first capacitor, the first inductor, the first capacitor and the second inductor are connected in series, the switch is connected in parallel with the second inductor, and the rectifier circuit is connected to both ends of the second inductor, wherein when the switch is turned on, both ends of the second inductor are short-circuited to increase energy of the first inductor and the first capacitor.

2. The circuit according to claim 1, wherein the switch is a bidirectional switch, and the bidirectional switch includes back-to-back switch tubes in series.

3. The circuit according to claim 1, wherein the inverter circuit comprises a full-bridge inverter circuit or a half-bridge inverter circuit.

4. The circuit according to claim 1, wherein the first capacitor comprises a first sub-capacitor and a second sub-capacitor connected in parallel.

5. The circuit according to claim 1, wherein rectifier tubes in the rectifier circuit comprise at least one diode and/or at least one synchronous rectifier tube.

6. The circuit according to claim 1, wherein the second inductor is integrated into a transformer in the rectifier circuit and taken as a magnetizing inductor of the transformer, or, the second inductor is an inductor independent of the rectifier circuit.

7. The circuit according to claim 1, wherein both ends of the switch are connected to bidirectional transient voltage suppression diodes, the bidirectional transient voltage suppression diodes for voltage clamping.

8. A power supply device, comprising the resonant converter circuit as claimed in 1, an input terminal and an output terminal.

9. The circuit according to claim 1, further comprising a drive control circuit, the drive control circuit connected to the switch for outputting a control signal to the switch.

10. The circuit according to claim 9, wherein the drive control circuit comprises:
a sampling circuit to sample an output voltage of the rectifier circuit, the sampling circuit to generate an output voltage sampling signal;
a control circuit electrically connected to the sampling circuit, the control circuit to generate a control signal according to the output voltage sampling signal; and
a driving circuit connected to the control circuit and the switch, the driving circuit to drive the switch to turn on or off according to the control signal.

11. The circuit according to claim 10, wherein the driving circuit is connected to the inverter circuit, and the driving circuit is configured to drive switch tubes of the inverter circuit to turn on or off according to the control signal, so as to control an operating frequency of the inverter circuit.

12. A method for controlling a resonant converter circuit, the method comprising:
sampling an output voltage of a resonant converter circuit to generate an output voltage sampling signal;
generating a control signal according to the output voltage sampling signal; and
driving a switch to turn on or off according to the control signal,
wherein the resonant converter circuit comprising:
an inverter circuit;
a resonant circuit;
a rectifier circuit;
a switch; and
a second inductor, wherein,
the inverter circuit is connected to the resonant circuit for converting direct currents into alternating currents to output to the resonant circuit, the resonant circuit is connected to the rectifier circuit for outputting the alternating currents to the rectifier circuit after resonant conversion, and the rectifier circuit is used for outputting direct currents;
the resonant circuit comprises a first inductor and a first capacitor, the first inductor, the first capacitor and the second inductor are connected in series, the switch is connected in parallel with the second inductor, and the rectifier circuit is connected to both ends of the second inductor,
wherein when the switch is turned on, both ends of the second inductor are short-circuited to increase energy of the first inductor and the first capacitor.

13. The method according to claim 12, comprising: driving switch tubes of the inverter circuit to turn on or off according to the control signal, so as to control an operating frequency of the inverter circuit.

14. The method according to claim 13, wherein a conduction time of the switch is controlled after the operating frequency reaches a preset frequency.

15. The method according to claim 12, wherein the driving of the switch to turn on or off according to the control signal comprises: controlling the switch to turn on at a predetermined time period of each switch cycle to short-circuit both ends of the second inductor.

16. The method according to claim 15, wherein the switch cycle is greater than a resonant period $2\pi\sqrt{L_r C_r}$, obtained according to the first inductor $L_r$ and the first capacitor $C_r$, and the predetermined time period is a latter time period of the switch cycle with positive input voltage of the resonant circuit and a latter time period of the switch cycle with negative input voltage of the resonant circuit.

* * * * *